No. 880,504. PATENTED MAR. 3, 1908.
W. C. BRIGHAM.
WAGON WHEEL.
APPLICATION FILED SEPT. 26, 1906.
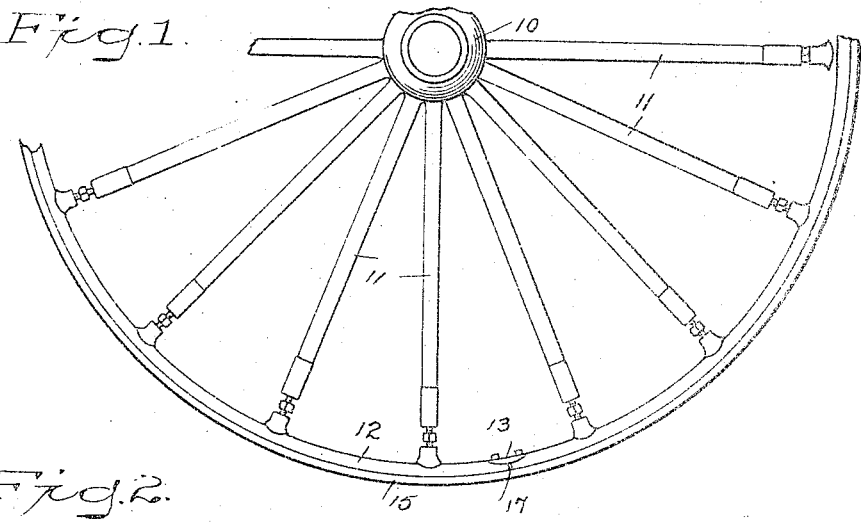
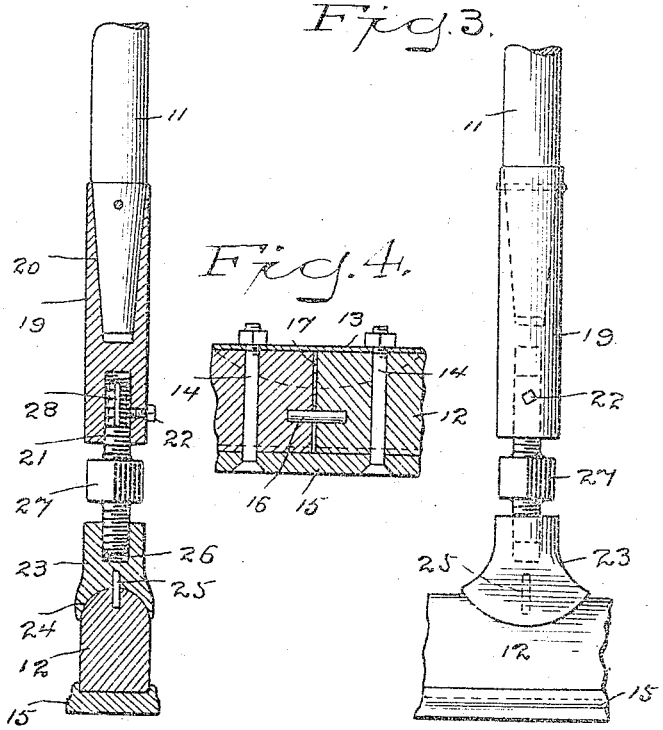
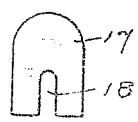
WITNESSES
H. A. Lamb
S. W. Atherton
INVENTOR
William C. Brigham
BY
A. M. Wooster
ATTORNEY

UNITED STATES PATENT OFFICE.

WILLIAM C. BRIGHAM, OF DANBURY, CONNECTICUT.

WAGON-WHEEL.

No. 880,504.  Specification of Letters Patent.  Patented March 3, 1908.

Application filed September 26, 1906. Serial No. 336,216.

*To all whom it may concern:*

Be it known that I, WILLIAM C. BRIGHAM, a citizen of the United States, residing at Danbury, county of Fairfield, State of Connecticut, have invented a new and useful Wagon-Wheel, of which the following is a specification.

This invention relates to wagon wheels, particularly of the type having wood spokes and felly, and one of the objects of the invention is to provide a spoke connection that will enable a new spoke to be conveniently set in the place of a damaged one, or to repair said damaged spoke.

Another object of the invention is to provide a structure by means of which the length of one or any number of the spokes may be varied so that the felly and tire mounted thereon may be trued up.

To these ends, the invention consists in the construction and combination of parts, substantially as hereinafter described and claimed.

Of the accompanying drawings:—Figure 1 represents a side elevation of a portion of a wheel embodying my invention. Fig. 2 is a detail view, partly in section, of one form of adjustable connection embodying my invention. Fig. 3 represents a side elevation of the construction shown in Figs. 1 and 2. Fig. 4 is a detail sectional view showing the means for uniting the ends of the felly or rim. Fig. 5 is a detail elevation of a filling plate which may be used between the meeting ends of the felly.

Similar reference characters indicate the same or similar parts in all of the figures.

The hub 10 may have the spokes 11 connected thereto in any preferred manner, but said spokes are not of a length for direct connection with the rim or felly 12. Said rim or felly may be made in two pieces, being connected together at each end by a plate or bridge 13, having bolts 14 passing through it and through the felly and the tire 15 as shown in Fig. 5. A suitable pin or dowel 16 is preferably employed to connect the meeting ends of the felly and in order to properly fill the space between said ends of the felly, a plate 17, having a slot 18, may be employed, said slot permitting the filling plate 17 to be inserted after the dowel pin 16 is in place and before applying the bridge or connecting plate 13. Said filling plate may be of any desired thickness, and one or more of them may be employed so as to compensate for shrinkage of the felly.

When the bridge or connecting plate 13 is secured in place, it serves to secure the filling plate or plate 17 in position.

The spoke-tip, or socket-piece 19, is preferably formed at its inner end with a tapered recess or socket 20, adapted to receive the correspondingly formed end of spoke 11, so that they can be secured by a drive fit.

Referring to Figs. 2 and 3, in connection with Fig. 1, the spoke tip is formed with a threaded socket 21 at its outer end, a set screw 22 passing through the side of the tip, and adapted to engage the screw in said socket as hereinafter described.

In alinement with each spoke-tip is a footpiece 23, having its outer end 24 which bears upon the felly 12, shaped to fit said felly, so that the foot piece can have no turning movement on said felly. Each foot piece lies wholly external to the inner surface of the felly, having no projection to enter the felly. Therefore the devices can be put in place without weakening the felly by the boring of a hole. To prevent displacement of the foot piece by movement along the felly, a dowel pin may be driven in if desired, such as indicated at 25, the foot piece having a small recess to receive such dowel. The inner end of the foot piece is formed with a threaded socket 26.

A right and left hand screw 27, having an angular portion by means of which it may be turned for adjustment, connects the spoke-tip and foot-piece, the inner end of said screw having a plurality of vertical grooves 28 adapted to receive the inner end of the set screw 22, so that when said screw 27 has been adjusted as desired, the set screw 22 may be turned in so as to engage one of the grooves 28 to hold the adjusting screw from turning in the spoke-tip. As the foot-piece cannot rotate owing to the shape of its lower end bearing on the felly, the adjustment effected cannot be disturbed accidentally. It will be noticed that the grooves 28 do not extend the full length of the portion of the screw which enters the socket 21, and therefore the presence of said grooves will not permit water to gain access to the interior of the socket in the spoke-tip.

It will now be understood that I have provided a connection for the spoke and felly of a wheel which will permit of the adjustment of the felly for truing up purposes. Furthermore, if a spoke has been broken or otherwise damaged, and it is desired to substitute a new one therefor, the substitution can be readily effected because the spoke proper is short enough so that its inner end can be readily inserted in the usual socket of the hub, the foot-piece being at this time set up close to the spoke-tip. After the foot-piece is brought to position, opposite the inner surface of the felly, the screw adjustment will enable said foot piece to be set against the felly with the desired pressure, so as to firmly secure the spoke in place.

Having now described my invention, what I claim is:— .

An adjustable connection for a spoke and felly comprising a spoke-tip, a foot-piece bearing on the felly, one of said parts having a threaded socket, a screw connecting said parts and having a portion entering said socket, said portion having a groove normally lying wholly within said socket, and a set screw adapted to engage said groove.

In testimony whereof I affix my signature, in presence of two witnesses.

WILLIAM C. BRIGHAM.

Witnesses:
A. M. WOOSTER,
S. W. ATHERTON.